(12) United States Patent
Sugita et al.

(10) Patent No.: US 7,201,987 B2
(45) Date of Patent: *Apr. 10, 2007

(54) MEMBRANE ELECTRODE ASSEMBLY, AND FUEL CELL UNIT

(75) Inventors: Narutoshi Sugita, Utsunomiya (JP); Hideaki Kikuchi, Kawachi-gun (JP); Yoshihiro Nakanishi, Kawachi-gun (JP); Tadashi Nishiyama, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 10/185,371

(22) Filed: Jun. 27, 2002

(65) Prior Publication Data

US 2003/0003342 A1    Jan. 2, 2003

(30) Foreign Application Priority Data

Jun. 29, 2001    (JP)    ............................ P2001-199779

(51) Int. Cl.
    H01M 2/08    (2006.01)
    H01M 8/02    (2006.01)
(52) U.S. Cl. ...................................... 429/35
(58) Field of Classification Search ................ 429/30, 429/34–37
    See application file for complete search history.

(56) References Cited

U.S. PATENT DOCUMENTS 5,264,299 A * 11/1993 Krasij et al. .................. 429/30
5,464,700 A * 11/1995 Steck et al. .................... 429/30
5,529,855 A *  6/1996 Watanabe ...................... 429/34
6,057,054 A *  5/2000 Barton et al. .................. 429/42
6,261,711 B1 * 7/2001 Matlock et al. ............... 429/34
2003/0215690 A1* 11/2003 Wald et al. .................... 429/35

FOREIGN PATENT DOCUMENTS

JP          10-289722        10/1998

* cited by examiner

Primary Examiner—Tracy Dove
(74) Attorney, Agent, or Firm—Lahive & Cockfield, LLP; Anthony A. Laurentano, Esq.

(57) ABSTRACT

In order to provide an membrane electrode assembly having an electrolyte membrane in which bending and warping of a solid polymer electrolyte membrane are prevented so as to facilitate the handling ability, in the membrane electrode assembly having an electrolyte membrane comprising a solid polymer electrolyte membrane, and a pair of gas diffusion electrodes which are disposed on both sides of the solid polymer electrolyte membrane, a flat surface having the same size as the solid polymer electrolyte membrane is formed by disposing a frame-shaped seal member on an outer surface of the gas diffusion electrode, and the flat surface closely contacts to the solid polymer electrolyte membrane so as to be able to cover and support the solid polymer electrolyte membrane.

1 Claim, 12 Drawing Sheets

MEMBRANE ELECTRODE ASSEMBLY, AND FUEL CELL UNIT

BACKGROUND OF THE INVENTION

1. Field of the Invention

The present invention relates to a membrane electrode assembly having an electrolyte membrane which comprises a solid polymer electrolyte membrane and a pair of gas diffusion electrodes which are disposed on both sides of the solid polymer electrolyte membrane, and to a fuel cell unit in which the membrane electrode assembly having an electrolyte membrane is placed between a pair of separators. In particular, the present invention relates to a membrane electrode assembly having a membrane electrolyte membrane and to a fuel cell unit which can improve the sealing ability on an outer side of the solid polymer electrolyte membrane and prevent gas leakage to the outside.

2. Description of Related Art

The fuel cells are known having a structure in which a fuel cell unit is made by sandwiching a membrane electrode assembly, which has an electrolyte membrane comprising a solid polymer electrolyte membrane comprising an anode side gas diffusion layer and a cathode side gas diffusion layer which are disposed on both sides of the membrane between a pair of separators, and in which a plurality of the cell of the fuel cell are stacked.

One example of such a case is explained with reference to FIGS. 10 and 11. In these drawings, reference numeral 1 indicates a membrane electrode assembly having an electrolyte membrane. This membrane electrode assembly 1 having an electrolyte membrane comprises a solid polymer electrolyte membrane 2 and gas diffusion layers (an anode side gas diffusion layer and a cathode side gas diffusion layer) 3 and 4 which are disposed on both sides of the membrane. A catalyst layer is disposed between the solid polymer electrolyte membrane 2 and each of the gas diffusion layers 3 and 4. The solid polymer electrolyte membrane 2 is formed so as to have planar dimensions that are larger than planar dimensions of the anode side gas diffusion layer 3 and the cathode side gas diffusion layer 4 which are disposed on both sides thereof, and the solid polymer electrolyte membrane 2 extends over a periphery of the diffusion layers 3 and 4. A pair of separators 5 and 6 are disposed on both sides of the membrane electrode assembly 1 having an electrolyte membrane as shown in FIG. 11. Round-shaped seal members 7 are set at the peripheral edge side of the opposing surfaces of separators 5 and 6; thus, the solid polymer electrolyte membrane 2 is sandwiched between the round-shaped seal members 7. A fuel cell 8 is structured by disposing the membrane electrode assembly 1 having an electrolyte membrane between the separators 5 and 6 in such a state. In addition, in the separators 5 and 6, gas communication channels 9 and 10 for supplying fuel gas, oxidant gas, and cooling medium communication channels 11 for supplying cooling medium are formed.

In the fuel cell 8 which is structured in the above manner, when a fuel gas (for example, hydrogen gas) is supplied to a reaction surface of the anode side gas diffusion layer 3 via the gas communication channels 9, the hydrogen is ionized by the catalyst layer and transmitted to the cathode side gas diffusion layer 4 via the solid polymer electrolyte membrane 2. Electrons which are generated during such a process are taken to an external circuit and used for direct current electric energy. Because an oxidant gas (for example, a gas including oxygen) is supplied to the cathode side gas diffusion layer 4, hydrogen ions, electrons and oxygen react there, and a water is generated.

However, in the solid polymer electrolyte membrane 2, as shown in FIG. 10, a part of the solid polymer electrolyte membrane 2 extends from the peripheries of the diffusion layers 3 and 4. Therefore, if there is any difference in the positions of the opposing seal members 7 which have the solid polymer electrolyte membrane 2 therebetween, a shearing stress acts thereon; therefore, there is a possibility that the solid polymer electrolyte membrane 2 may be damaged. Also, when a fuel gas and an oxidant gas are supplied to a cell of the fuel cell 8, a difference of pressure 12 (pressure difference between the electrodes) occurs between the one side and the other side of the solid polymer electrolyte membrane 2; thus, as shown in FIG. 12, there is a possibility that warping 13 occurs in the solid polymer electrolyte membrane 2. Therefore, it is necessary very precisely to perform the positioning operation of the opposing seal members 7 which have the solid polymer electrolyte membrane 2 therebetween. There is a problem in that it takes a lot of time to produce a cell of the fuel cell 8 while maintaining the required precision; thus, it is burdensome from the viewpoint of efficient production.

Regarding this aspect, a fuel cell unit 20 having a structure shown in FIG. 13 is disclosed in Japanese Unexamined Patent Application, First Publication No. Hei 10-289722. That is, a gas diffusion layer 25 having nearly the same dimensions as a solid polymer electrolyte membrane 22 is disposed on an opposite surface of a catalyst layer 23 which contacts the solid polymer electrolyte membrane 22 so as to form a unit with the catalyst layer 23, and the peripheral edge section of the solid polymer electrolyte membrane 22 is reinforced by contacting the gas diffusion layer 25 to the peripheral edge section of the solid polymer electrolyte membrane 22. Also, a seal member 26 having a C-shaped cross section on one side is disposed so as to cover an end section of the gas diffusion layer 25; thus, prevention of gas leakage to the outside is intended.

However, in the cell of the fuel cell 20, because it is necessary to form the gas diffusion layer 25 so as to be nearly the same size as the solid polymer electrolyte membrane 22, there is a problem in that the material procurement cost increases due to the extra cost for material procurement. Also, the size of the gas diffusion layer 25 is different from the size of another gas diffusion layer 25b; thus, the number of parts increases, and the production process becomes complicated.

Furthermore, in the cell of the fuel cell 20, there is a problem in that it is burdensome to form the seal member 26 so as to fit to the shape of the gas diffusion layer 25 and to assemble the seal member 26 so as to cover the gas diffusion layer 25 because the seal member 26 having a C-shaped cross section is disposed so as to cover an end section of the gas diffusion layer 25.

SUMMARY OF THE INVENTION

Here, an object of the present invention is to provide a membrane electrode assembly having an electrolyte membrane in which the cost can be reduced, which can protect and reinforce the solid polymer electrolyte membrane, and in which handling is easy.

Another object of the present invention is to provide a fuel cell unit which can be assembled easily.

Yet, another object of the present invention is to provide a fuel cell unit in which gas can be prevented from leaking to the outside more securely.

In order to solve the above problems, a first aspect of the present invention is a membrane electrode assembly having an electrolyte membrane comprising a solid polymer electrolyte membrane, first and second gas diffusion electrodes which are disposed respectively on both sides of the solid polymer electrolyte membrane and a frame-shaped seal member which is disposed so as to surround a periphery of the first gas diffusion electrodes and covers and supports a peripheral part of the solid polymer electrolyte membrane extending over an outline of the first gas diffusion electrodes.

By arranging the structure in this way, it becomes possible to restrict the materials which are necessary for the gas diffusion electrode to a minimum for generating electricity and to protect and reinforce the solid polymer electrolyte membrane by means of the frame-shaped member. Therefore, it becomes possible to prevent the solid polymer electrolyte membrane from bending and warping; thus, handling becomes easier as compared to the conventional case. Also, it is acceptable if the sizes of the gas diffusion electrodes disposed on both sides of the solid polymer electrolyte membrane are the same; thus, it becomes possible to reduce the number of parts and to simplify the manufacturing process. Also, because there are fewer restrictions in arranging the position of the seal member which is disposed on an opposite surface of the solid polymer electrode membrane contacting the frame-shaped seal member, it is possible to significantly shorten the time which is required for the positioning of the seal member, and to increase the product yield.

In addition, if the frame-shaped seal member is formed so as to be the same thickness as the internal gas diffusion electrodes, it is preferable that the position of the solid polymer electrolyte membrane coincide with the position of the frame-shaped seal member during the assembling operation of the fuel cell unit. Also, the frame-shaped seal member should preferably be formed so as to overlap the gas diffusion electrode which is supported inside the frame-shaped seal member. By doing this way, the amount of contact between the frame-shaped seal member and the gas diffusion electrode increases; thus, it is possible to protect or reinforce the solid polymer electrolyte membrane more desirably. As the material for the seal member, carbon, metal, and resin rubber can be used preferably as long as sealing ability is provided. The frame-shaped seal members and the gas diffusion electrode which is supported therein may be formed integrally by using a bonding agent, and also may be integrally formed by methods such as injection molding, casting, and resin forming.

A second aspect of the present invention is a cell of a fuel cell comprising a membrane electrode assembly, and a pair of separators (for example, separators 52 and 54 in the embodiments) which sandwiches the membrane electrode assembly, wherein the membrane electrode assembly comprises a solid polymer electrolyte membrane, first and second gas diffusion electrodes which are disposed respectively on both sides of the solid polymer electrolyte membrane, a frame-shaped first seal member which is disposed so as to surround a periphery of the first gas diffusion electrodes and covers and supports a peripheral part of the solid polymer electrolyte membrane extending over an outline of the first gas diffusion electrodes, and a second seal member (for example, seal member 40 in the embodiment) which is disposed on the peripheral part of the solid polymer electrolyte membrane so as to surround a periphery of the second gas diffusion electrodes.

By arranging the structure in this way, because a more flexible positioning arrangement is possible as compared to the conventional case, it is possible to shorten the manufacturing time for the fuel cell unit, and to reduce the burden in the assembling operation. Also, because the solid polymer electrolyte membrane in the fuel cell unit structured in the above manner is supported while maintaining its flatness, it is possible to prevent the solid polymer electrolyte membrane from being damaged in the fuel cell unit which is caused by a pressure difference between the electrodes. Furthermore, because the outer periphery surface of the flat surface is made of a material having a sealing ability, it is possible to ensure a sufficient sealing ability to the outside only by sandwiching from above by means of the seal member without using a seal member having a complicated shape.

A third aspect of the present invention is a unit cell wherein a planar dimension of the pair of the separators (for example, separators 72 and 74 in the embodiments) is larger than a planar dimension of the membrane electrode assembly; and a third seal member (for example, seal member 41 in the embodiments) is disposed so as to surround a periphery of the membrane electrode assembly and is sandwiched by peripheral sections of the separators.

By arranging the structure in this way, in the membrane electrode assembly having an electrolyte membrane, even if the reaction gas leaks near the peripheral edge section of the separator, it is possible to prevent the reaction gas from leaking to the outside more securely by means of the seal member which is disposed at the peripheral edge section of the separator. Furthermore, because the sealing operation improves by performing an ordinary sealing operation on the supporting structure and the sealing structure, it is possible to more securely prevent the gas from leaking from the membrane electrode assembly having an electrolyte membrane to the outside.

As explained above, according to the first aspect of the present invention, because it is possible to restrain the materials which are necessary for the gas diffusion electrode to a minimum from the viewpoint of generating a necessary amount of electricity, it is possible to protect or reinforce the solid polymer electrolyte membrane by means of the frame-shaped seal member. Therefore, it is possible to prevent the solid polymer electrolyte membrane from bending and warping, and handling becomes easy as compared to the conventional case. Also, because it is acceptable if the sizes of the gas diffusion layers which are disposed on both sides of the solid polymer electrolyte membrane are the same, it is possible to decrease the number of parts and to simplify the manufacturing process. Also, in the solid polymer electrolyte membrane, since the positioning flexibility of the seal members which are to be disposed on opposing surfaces which contact the flat surface increases, it is possible to significantly shorten the time necessary for the positioning operations; thus, the product yield increases.

Also, according to the second aspect of the present invention, because a more flexible positioning arrangement is possible as compared to the conventional case, it is possible to increase the speed for manufacturing the fuel cell unit and to reduce the burden in the assembling operation. Also, because the solid polymer electrolyte membrane in the fuel cell unit structured in the above manner is supported while maintaining its flatness, it is possible to prevent the solid polymer electrolyte membrane from being damaged in the fuel cell unit which is caused by a pressure difference between the electrodes. Furthermore, because the outer periphery surface of the flat surface is made of a material having a sealing ability, it is possible to secure a sufficient sealing ability to the outside only by sandwiching from above by means of the seal member without using a seal member having a complicated shape.

According to the third aspect of the present invention, in the membrane electrode assembly having an electrolyte membrane, it is possible to prevent the gas from leaking by means of the seal member which is disposed at a peripheral edge section of the separator even if the reaction gas leaks near the peripheral edge section of the separator. Also, because the sealing operation improves by performing an ordinary sealing operation on the supporting structure and the sealing structure, it is possible to more securely prevent the gas from leaking from the membrane electrode assembly having an electrolyte membrane to the outside.

DETAILED DESCRIPTION OF THE INVENTION

Here, embodiments of the present invention are explained as follows with reference to the drawings.

Figure 1:
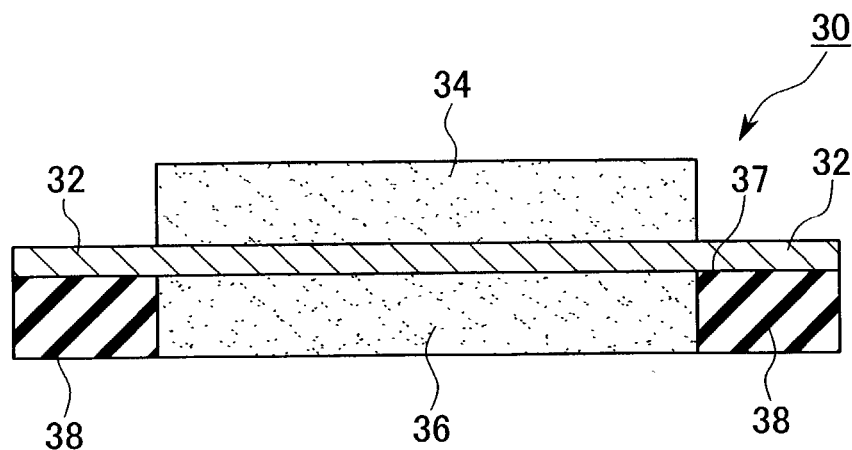
FIG. 1 is a cross section showing a first embodiment of the membrane electrode assembly having an electrolyte membrane of the present invention.

FIG. 1 is a cross section showing a membrane electrode assembly 30 having an electrolyte membrane of a first embodiment of the present invention. This membrane electrode assembly 30 having an electrolyte membrane is provided with a solid polymer electrolyte membrane 32, and an anode side gas diffusion layer 34 and a cathode side gas diffusion layer 36 which sandwich the solid polymer electrolyte membrane 32 there between. In this membrane electrode assembly 30 having an electrolyte membrane, a frame-shaped seal member 38 is integrally disposed on an outer periphery side of the cathode side gas diffusion layer 36. A catalyst is applied on the surfaces of the anode side gas diffusion layer 34 and the cathode side gas diffusion layer 36 which contact the surfaces of the membrane electrode assembly 30 having an electrolyte membrane. The anode side gas diffusion layer 34 and the cathode side gas diffusion layer 36 to which the catalyst is applied form a gas diffusion electrode. The cathode side gas diffusion layer 36 and the frame-shaped seal member 38 (hereinafter referred to as frame-shaped member 35) form a flat surface 37 having the same size as the solid polymer electrolyte membrane 32 and closely contact and support the solid polymer electrolyte membrane 32 to the flat surface 37. That is, a part of the solid polymer electrolyte membrane 32 which extends over the periphery of the cathode side gas diffusion layer 36 is covered and supported by the frame-shaped seal member 38 which is disposed so as to surround the periphery of the cathode side gas diffusion layer 36. By arranging the structure in this way, as shown in FIG. 1, the entire surface of the solid polymer electrolyte membrane 32 is maintained at the same height. Also, the frame-shaped seal member 38 of the present embodiment is assembled with the solid polymer electrolyte membrane 32 and bonded so as to be joined via a bonding agent (not shown in the drawing); thus, the bonding strength is enhanced.

The frame-shaped member 35 is formed so as to have the same thickness over the entire surface thereof. The frame-shaped member 35 of the present embodiment is formed by an injection molding method. That is, rubber such as silicon rubber or EPDM (ethylene propylene diene monomer) as a sealing material is injected into a mold while the cathode side gas diffusion layer 36 is maintained in a rectangle mold member so as to form the frame-shaped member 35. The frame-shaped member 35 to be formed is prepared in advance so as to have the same size as the solid polymer electrolyte membrane 32. Also, the periphery of the frame-shaped member 35 may be trimmed so as to be a same as the solid polymer electrolyte membrane 32 after the solid polymer electrolyte membrane 32 and the frame-shaped member 35 are assembled. In addition, the forming method for the frame-shaped member 35 is not limited to an injection molding method and can be preferably selected according to factors such as the material properties of the frame-shaped seal member 38. For example, when the frame-shaped seal member 38 is made from a resin or a rubber, an injection molding method is desirable. When the frame-shaped seal member 38 is made from metal, a casting method is desirable. Mold forming is desirable in the case of carbon. The anode side gas diffusion layer 34 and the cathode side gas diffusion layer 36 are made from a porous layer of porous carbon cloth or porous carbon paper, and a catalyst made mainly of platinum is disposed on an electrode surface (polymer electrolyte membrane 32). Perfluorosulfonic acid polymer is also used for the solid polymer electrolyte membrane 32.

Figure 2A:
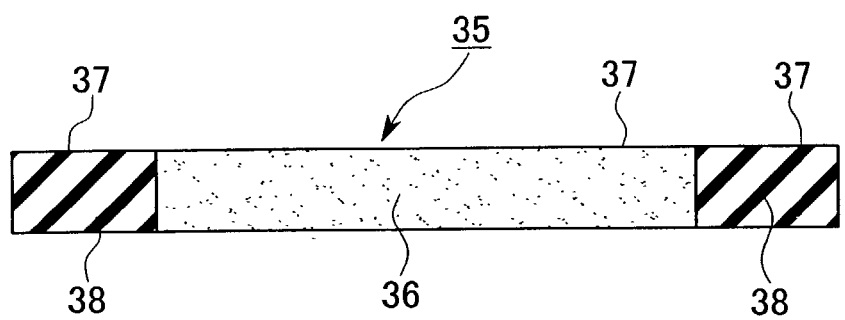
FIGS. 2A and 2B are cross sections showing a first embodiment of the membrane electrode assembly having an electrolyte membrane of the present invention and a manufacturing process for a membrane electrode assembly having an electrolyte membrane.
Figure 2B:
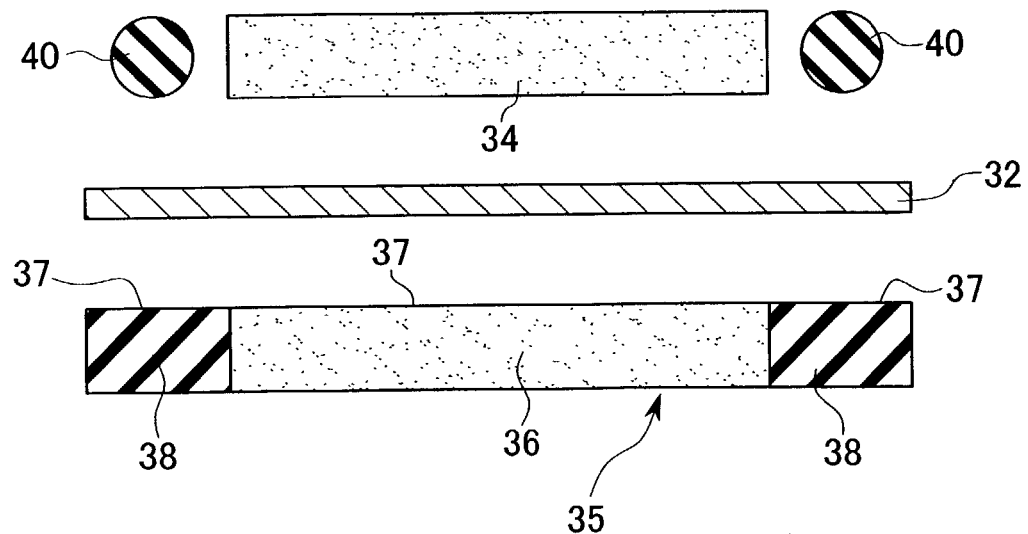

Consequently, the membrane electrode assembly 30 having an electrolyte membrane is manufactured by a hot-pressing method. An electrode catalyst layer is printed on the cathode side gas diffusion layer 36 and the anode side gas diffusion layer 34 in advance. Then, as shown in FIG. 2B, the anode side gas diffusion layer 34 is positioned on the upper surface of the solid polymer electrolyte membrane 32, and the cathode side gas diffusion layer 36 and the frame-shaped member 38 are positioned on the bottom surface of the solid polymer electrolyte membrane 32. Then the hot-pressing operation is performed. By using a bonding agent on the contacting surface of the frame-shaped seal member 38, it is possible to make the membrane electrode assembly 30 having an electrolyte membrane more rigid. In addition, a seal member 40 is attached during the assembling of the cell of the fuel cell.

Because the membrane electrode assembly 30 having an electrolyte membrane which is formed in the above manner can minimize the number of necessary parts for the anode side gas diffusion layer 34 and the cathode side gas diffusion layer 36 and can protect or reinforce the solid polymer electrolyte membrane 32 by means of the frame-shaped seal member 38, it is possible to prevent the solid polymer electrolyte membrane from bending or warping; thus, handling becomes easier as compared to the conventional case. Also, because it is acceptable that the sizes of the anode side gas diffusion layer 34 and the cathode side gas diffusion layer 36 which are disposed on both sides of the solid polymer electrolyte membrane 32 be the same, it is possible to minimize the number of necessary parts and to simplify the manufacturing process. Also, in the solid polymer electrolyte membrane, since the positioning flexibility of the seal member which is to be disposed on surfaces which contact the flat surface increases, it is possible to significantly shorten the time necessary for the positioning operation; thus, the product yield increases.

Figure 3:
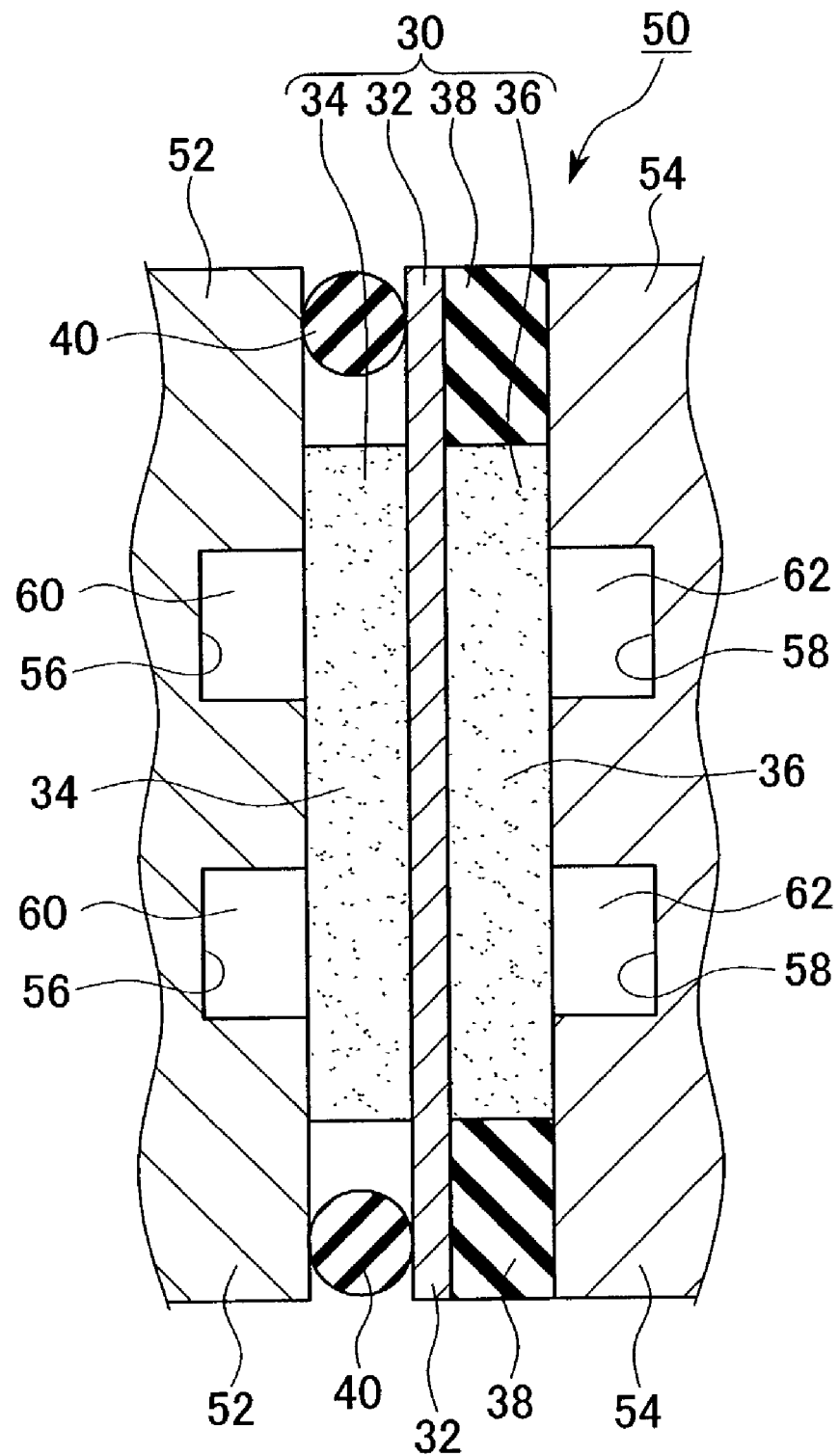
FIG. 3 is a cross section showing a main part of a fuel cell unit using the membrane electrode assembly having an electrolyte membrane in the first embodiment of the present invention.

FIG. 3 is a cross section showing the main portion of a fuel cell unit 50 using the membrane electrode assembly 30 having an electrolyte membrane. Here, the fuel cell unit 50 is structured by sandwiching the solid polymer electrolyte membrane 32 which is structured in the above-explained way by a pair of separators 52 and 54. Here, the separators 52 and 54 are made of dense carbon. A gas communication path 56 for supplying hydrogen gas 60 as a fuel gas is formed on the separator 52 of the anode side gas diffusion layer 34, and a gas communication path 58 for supplying air 62 (oxidant gas) is formed on the separator 54 of the cathode side gas diffusion layer 36.

In this way, the solid polymer electrolyte membrane 32 is supported by the frame-shaped member 35 while maintaining flatness in the fuel cell unit 50; therefore, there is no possibility that the solid polymer electrolyte membrane 32 will be damaged in the cell of the fuel cell 50 due to a pressure difference between the electrodes. Also, because the frame-shaped seal member 38 supports the peripheral edge section of the solid polymer electrolyte membrane 32 and has a sealing function for preventing the gas from leaking to the outside, it is possible to seal the solid polymer electrolyte membrane 32 to the outside while supporting the solid polymer electrolyte membrane 32 by sandwiching the solid polymer electrolyte membrane 32 by means of the frame-shaped seal member 38 and the seal member 40. Because of this, a seal member having a complicated shape is not necessary; thus, it is beneficial from the viewpoint of shortening the assembling time and decreasing the number of parts.

Figure 4:
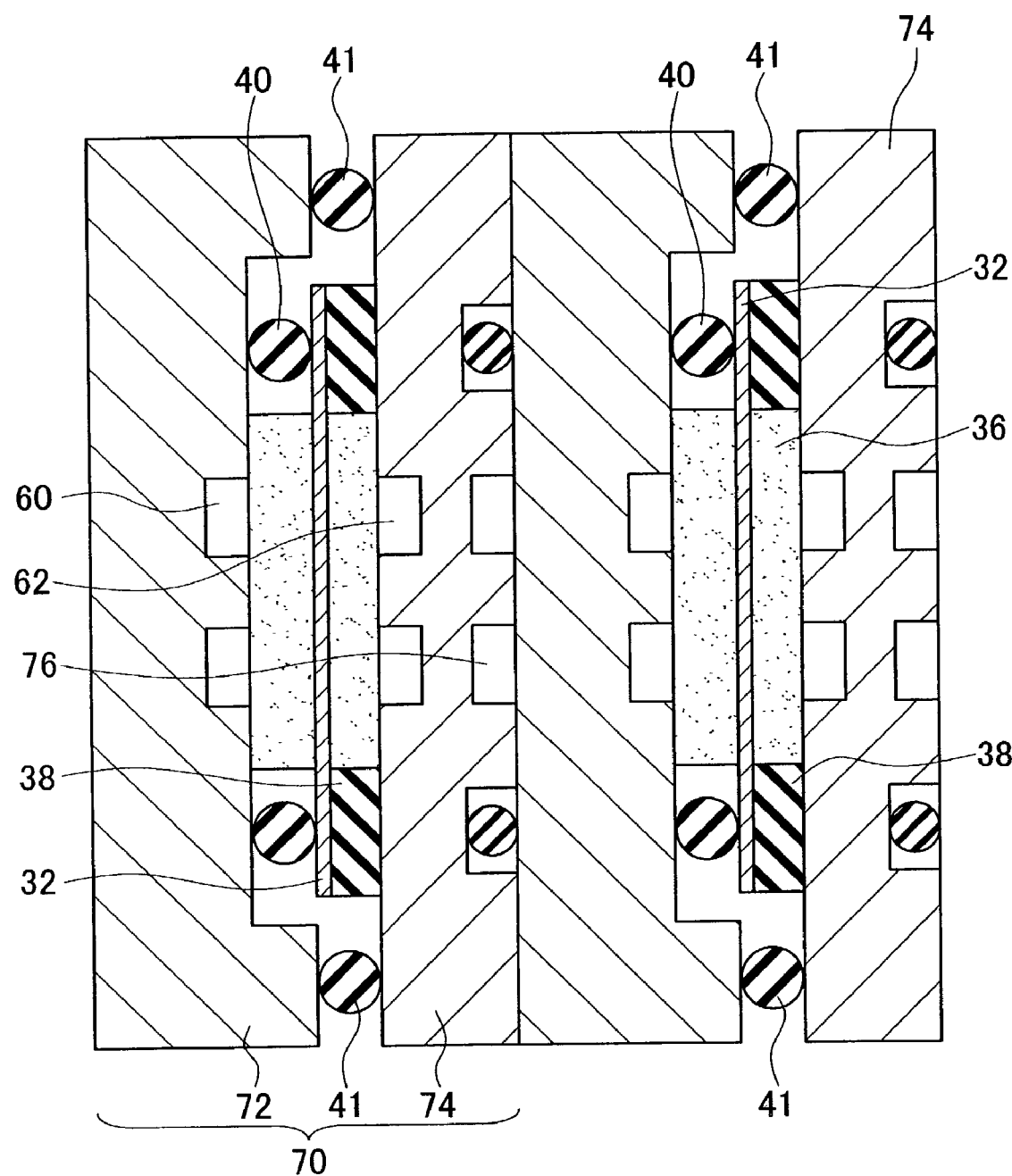
FIG. 4 is a cross section showing a modified example of the fuel cell unit using the membrane electrode assembly having an electrolyte membrane in the first embodiment of the present invention.

FIG. 4 is a cross section showing another example of a fuel cell unit 70 using an membrane electrode assembly 30 having an electrolyte membrane of the present invention. In the following explanation, the same reference numerals are used for the same items as the cell of the fuel cell 50 so as to avoid the duplicate explanation. The planar dimensions of separators 72 and 74 of the fuel cell unit 70 are larger than the planar dimensions of the membrane electrode assembly 30 having an electrolyte membrane, and a seal member 41 is disposed at a peripheral edge section of the pair of separators 72 and 74 around the outer side of the membrane electrode assembly 30 having an electrolyte membranes; thus such a structure is a double-sealing structure. As above explained, because in the membrane electrode assembly 30 having an electrolyte membrane, because the sealing operation is performed by means of the frame-shaped seal member 38 and the seal member 40, it is possible more securely to prevent the gas from leaking to the outside by means of the seal member 41. In addition, although the structure of the cell of the fuel cell 70 is a double-sealing structure, it is acceptable if the sealing structure is a multi-sealing structure. It is also acceptable if the structure of the cell of the fuel cell 70 has a multi-sealing structure such as a triple-sealing structure.

Figure 5:
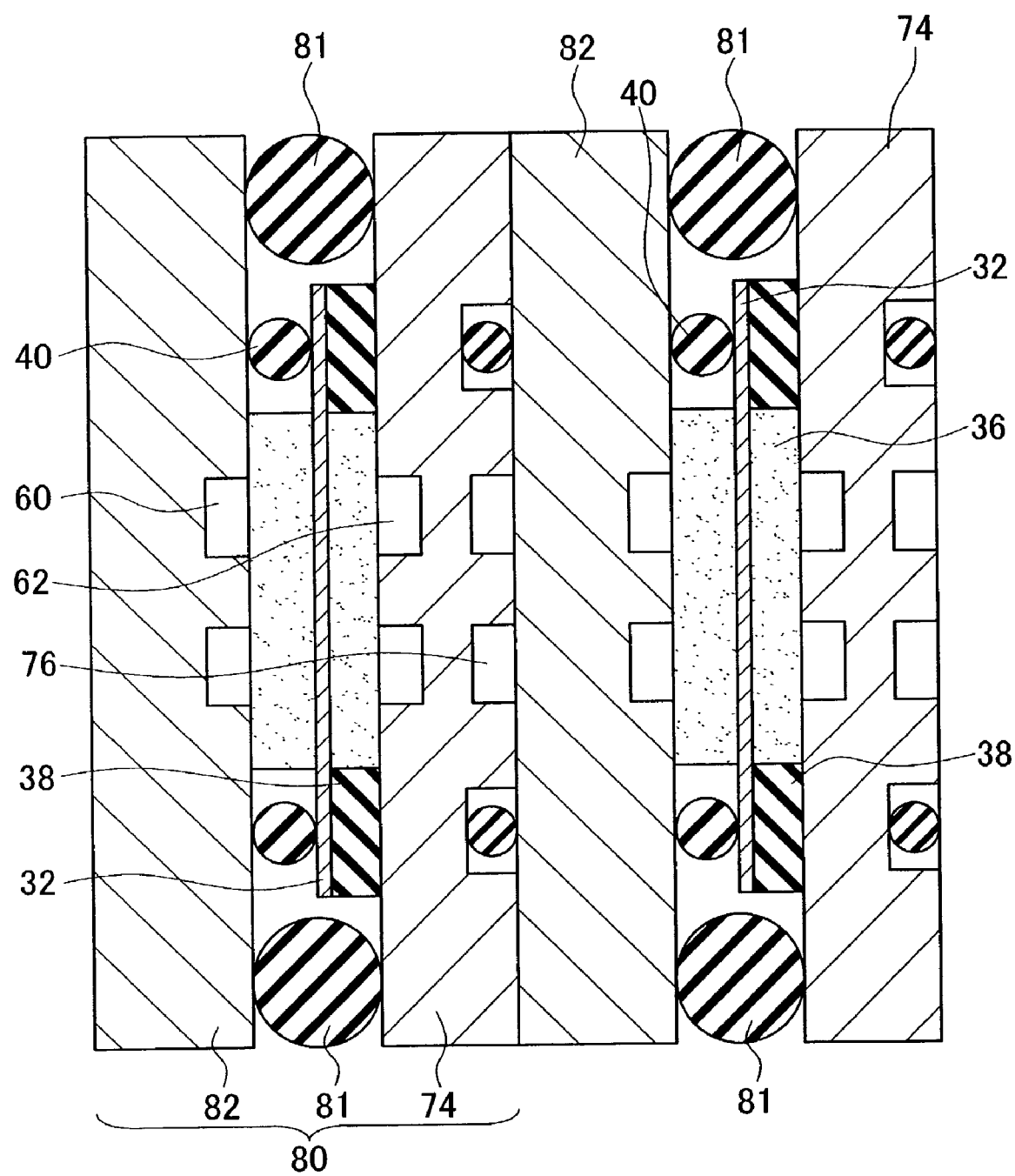
FIG. 5 is a cross section showing another modified example of the fuel cell unit using the membrane electrode assembly having an electrolyte membrane in the first embodiment of the present invention.

FIG. 5 is a cross section showing a further example of a fuel cell unit 80 using a membrane electrode assembly 30 having an electrolyte membrane of the present invention. In the following explanation, the same reference numerals are used for the same items as the cells of the fuel cell 50 and 70 so as to avoid the duplicate explanation. A surface of a separator 82 of the fuel cell unit 80 opposing the separator 74 is formed on a flat surface having no gap, and the sealing structure here is a double-sealing structure in which a seal member 81 is disposed at a peripheral edge section of the separators 82 and 74. In addition, it is acceptable if the cell of the fuel cell 80 has a multi-sealing structure in the same way of the cell of the fuel cell 70 as above explained.

Figure 6:
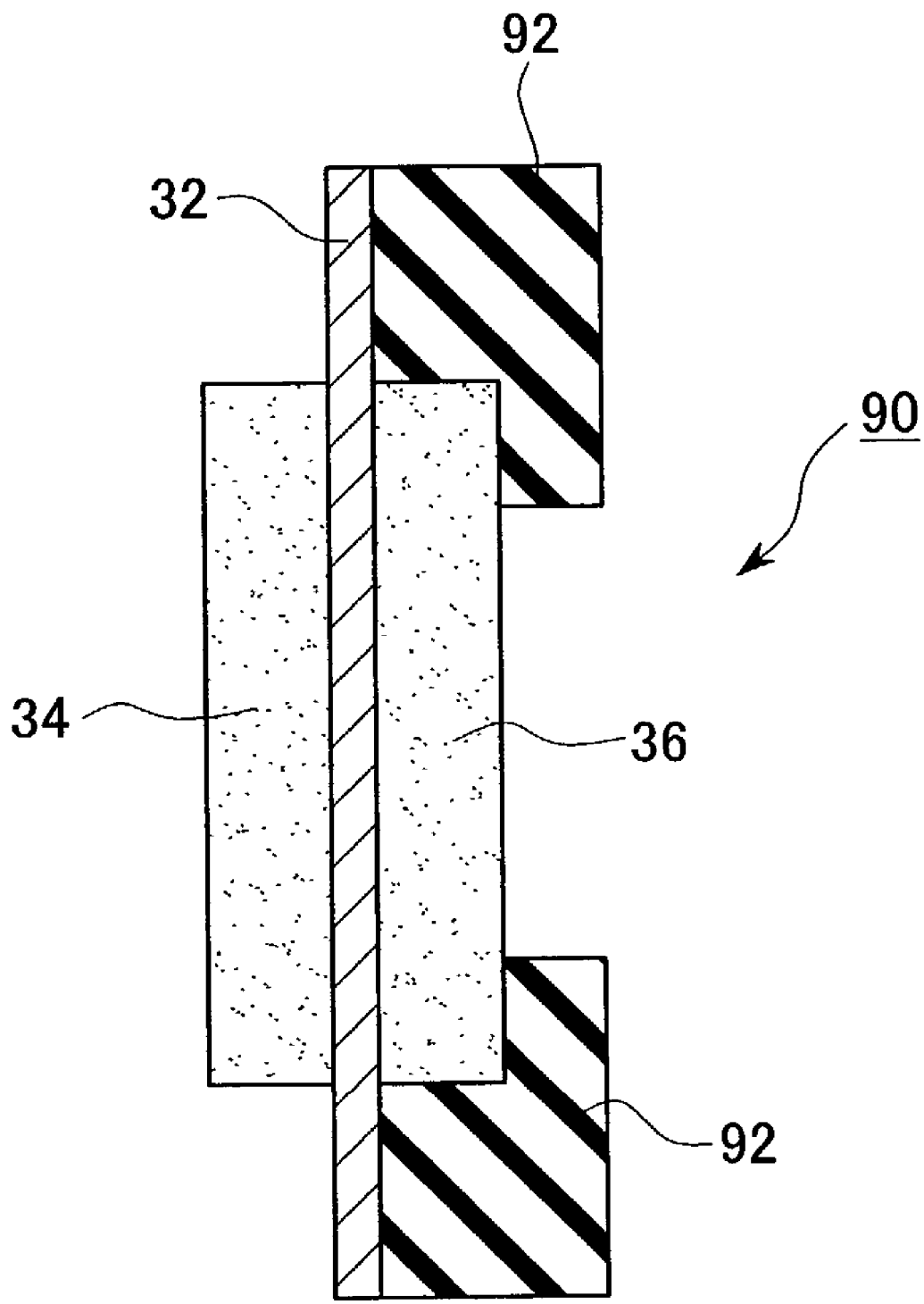
FIG. 6 is a cross section showing a second embodiment of the membrane electrode assembly having an electrolyte membrane of the present invention.

FIG. 6 is a cross section showing a membrane electrode assembly 90 having an electrolyte membrane of a second embodiment of the present invention. In the membrane electrode assembly 90 having an electrolyte membrane shown in FIG. 6, a frame-shaped seal member 92 overlaps an outer side (surface) peripheral edge section of the cathode side gas diffusion layer 36. In this way, the bonding force between the cathode side gas diffusion layer 36 and the frame-shaped seal member 38 is strengthened in the overlapped region; thus, it is difficult for the frame-shaped seal member 38 to be removed. Because of this, it is possible to protect or reinforce the solid polymer electrolyte membrane 32.

Figure 7:
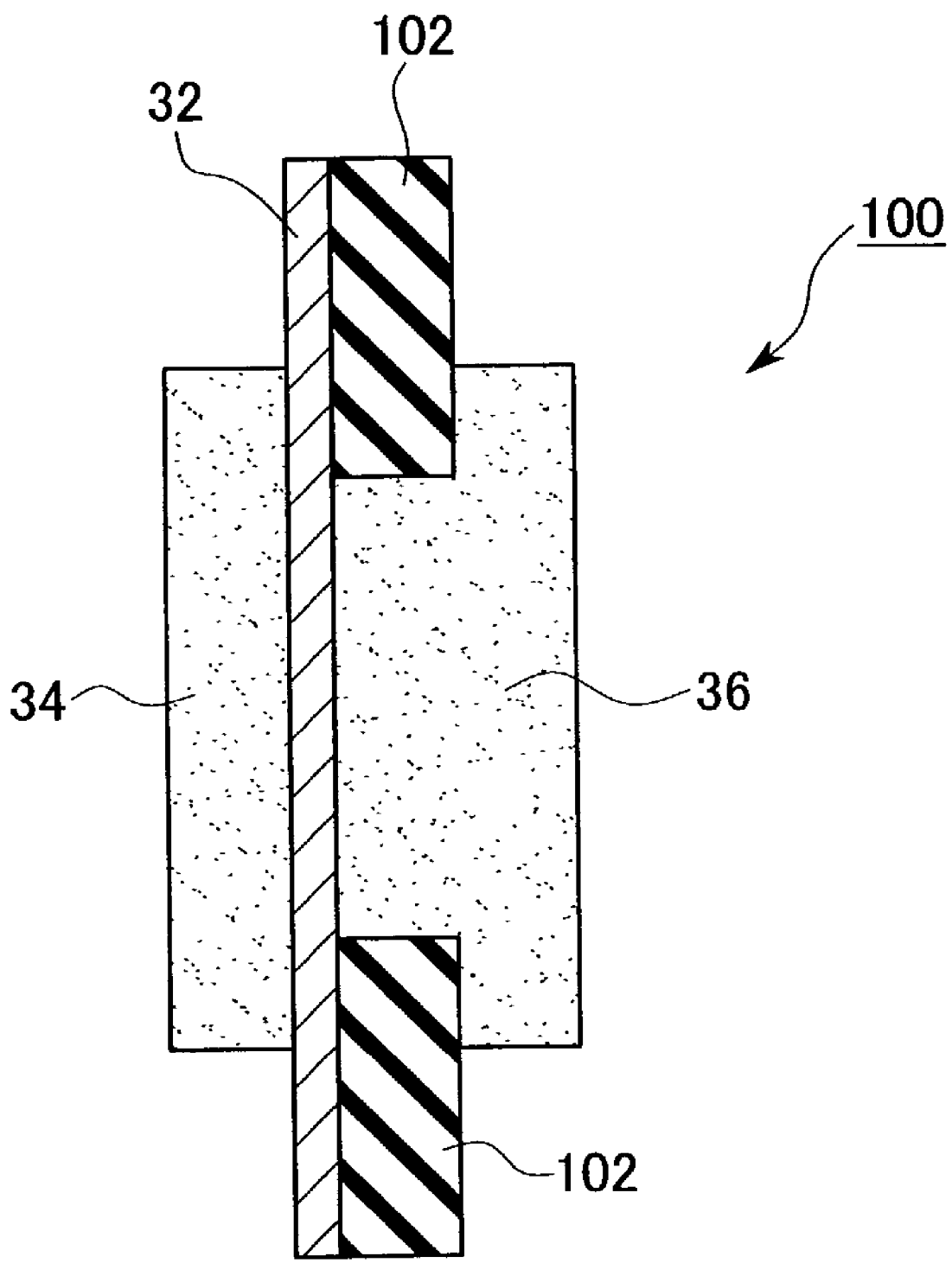
FIG. 7 is a cross section showing a third embodiment of the membrane electrode assembly having an electrolyte membrane of the present invention.

FIG. 7 is a cross section showing a membrane electrode assembly 100 having an electrolyte membrane of a third embodiment of the present invention. In the membrane electrode assembly 100 having an electrolyte membrane shown in FIG. 7, a frame-shaped seal member 102 overlaps an inner surface (the surface near the solid polymer electrolyte membrane 32) peripheral edge section of the cathode side gas diffusion layer 36; thus, like the case in FIG. 6, the bonding force between the cathode side gas diffusion layer 36 and the frame-shaped seal member 38 is strengthened in the overlapped region, and it is possible to protect or reinforce the solid polymer electrolyte membrane 32.

Figure 8:
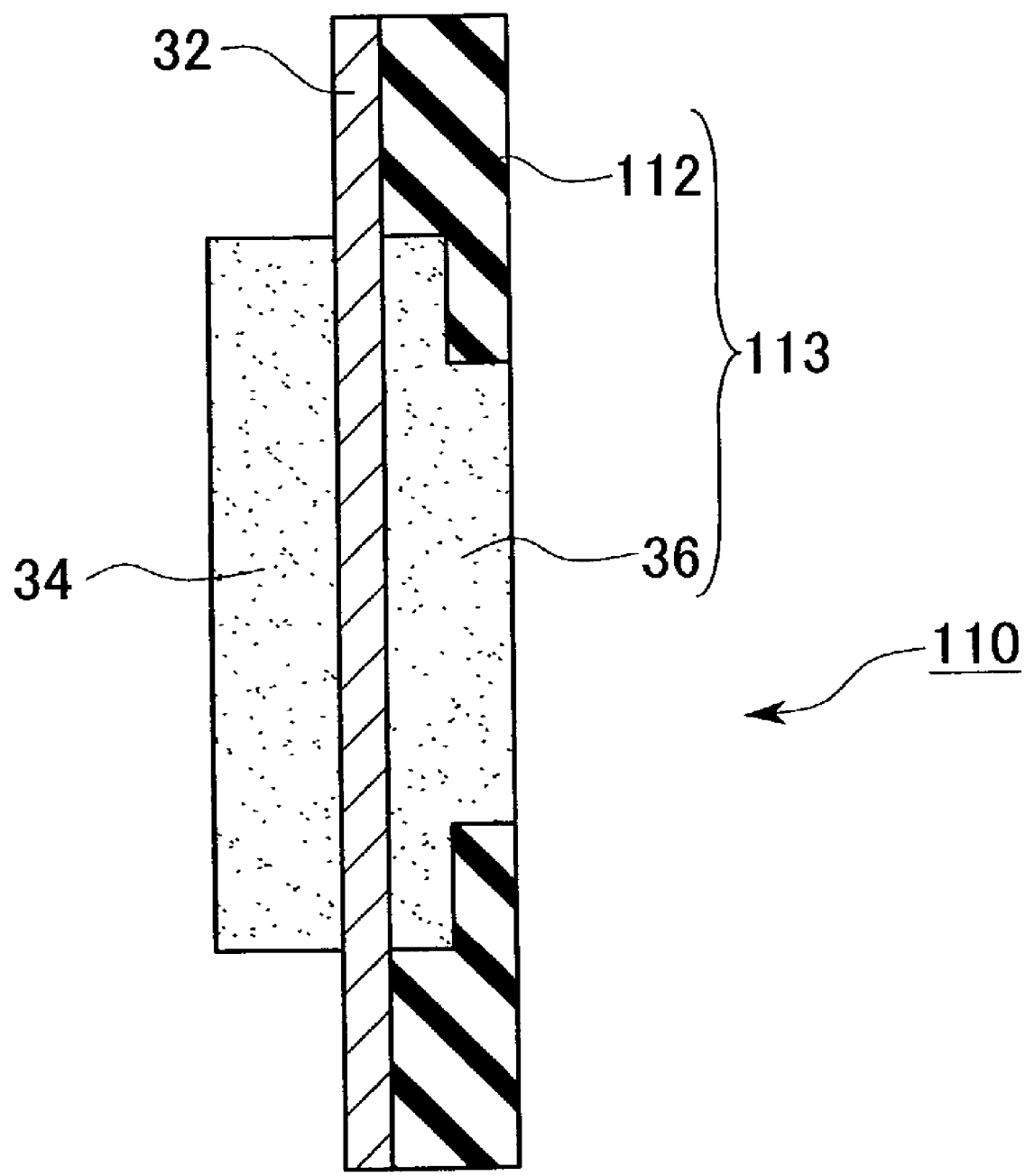
FIG. 8 is a cross section showing a fourth embodiment of the membrane electrode assembly having an electrolyte membrane of the present invention.

FIG. 8 is a cross section showing a membrane electrode assembly 110 having an electrolyte membrane of a fourth embodiment of the present invention. In the membrane electrode assembly 110 having an electrolyte membrane, a frame-shaped seal member 112 overlaps an outer surface peripheral edge section of the cathode side gas diffusion layer 36, and the thickness of the frame-shaped member 113 which is formed by the frame-shaped seal member 112 and the cathode side gas diffusion layer 36 is formed so as to be the same over the entire surface thereof. In this way, in addition to the effect of overlapping in the second embodiment as above explained, it is possible to uniform the pressure occurring during sandwiching by means of the separator when forming the fuel cell unit; thus, it is possible to increase the strength in the thickness direction.

Figure 9:
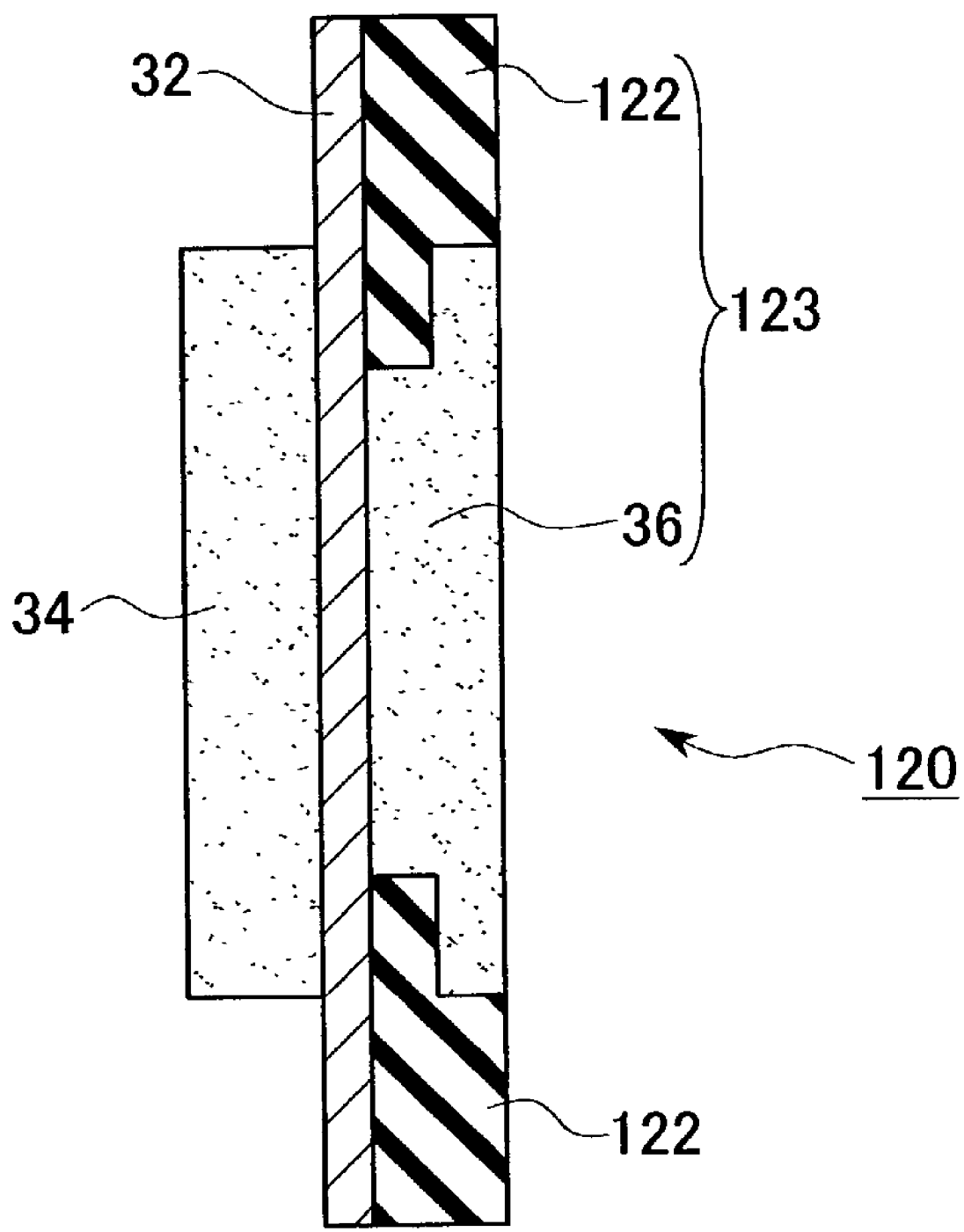
FIG. 9 is a cross section showing a fifth embodiment of the membrane electrode assembly having an electrolyte membrane of the present invention.
Figure 10:
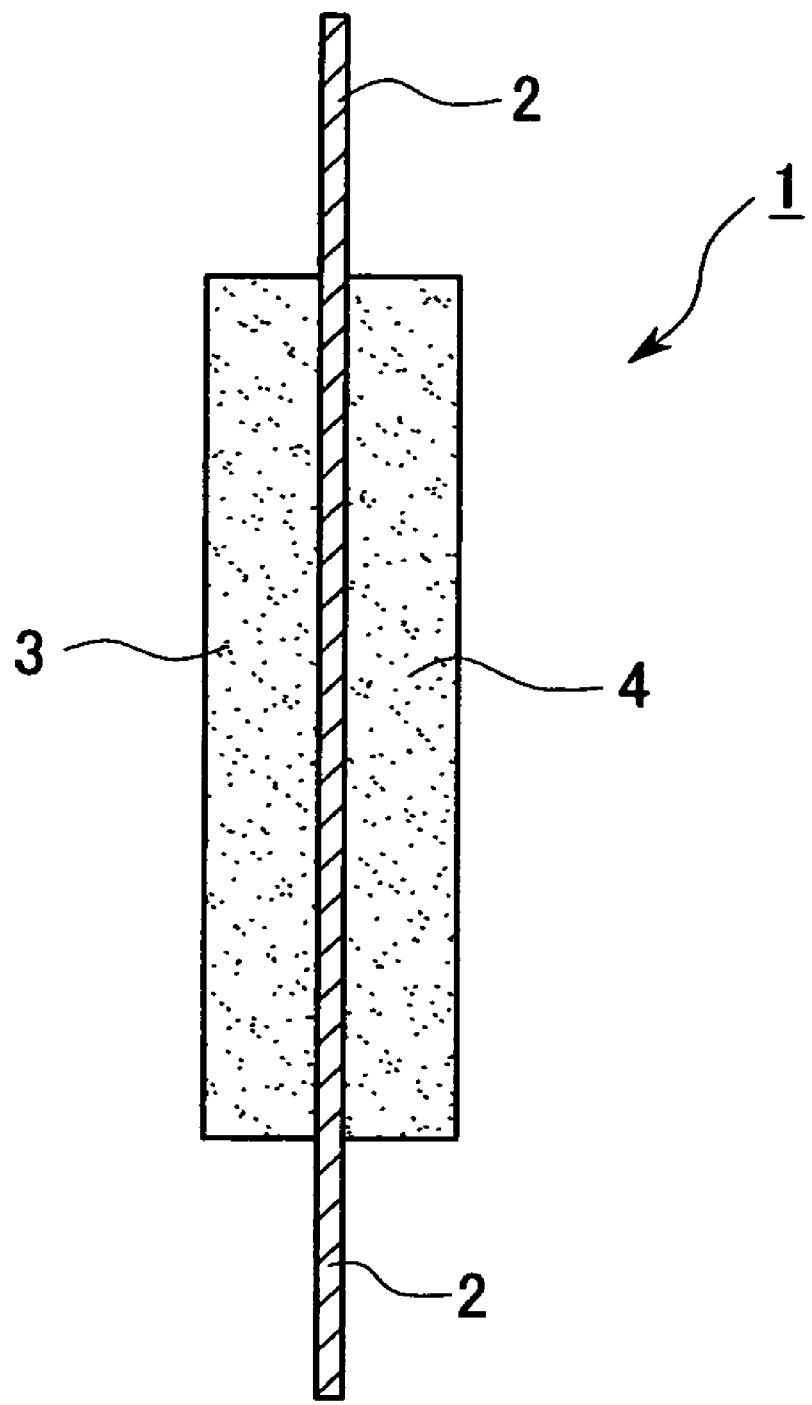
FIG. 10 is a cross section showing a conventional membrane electrode assembly having an electrolyte membrane.
Figure 11:
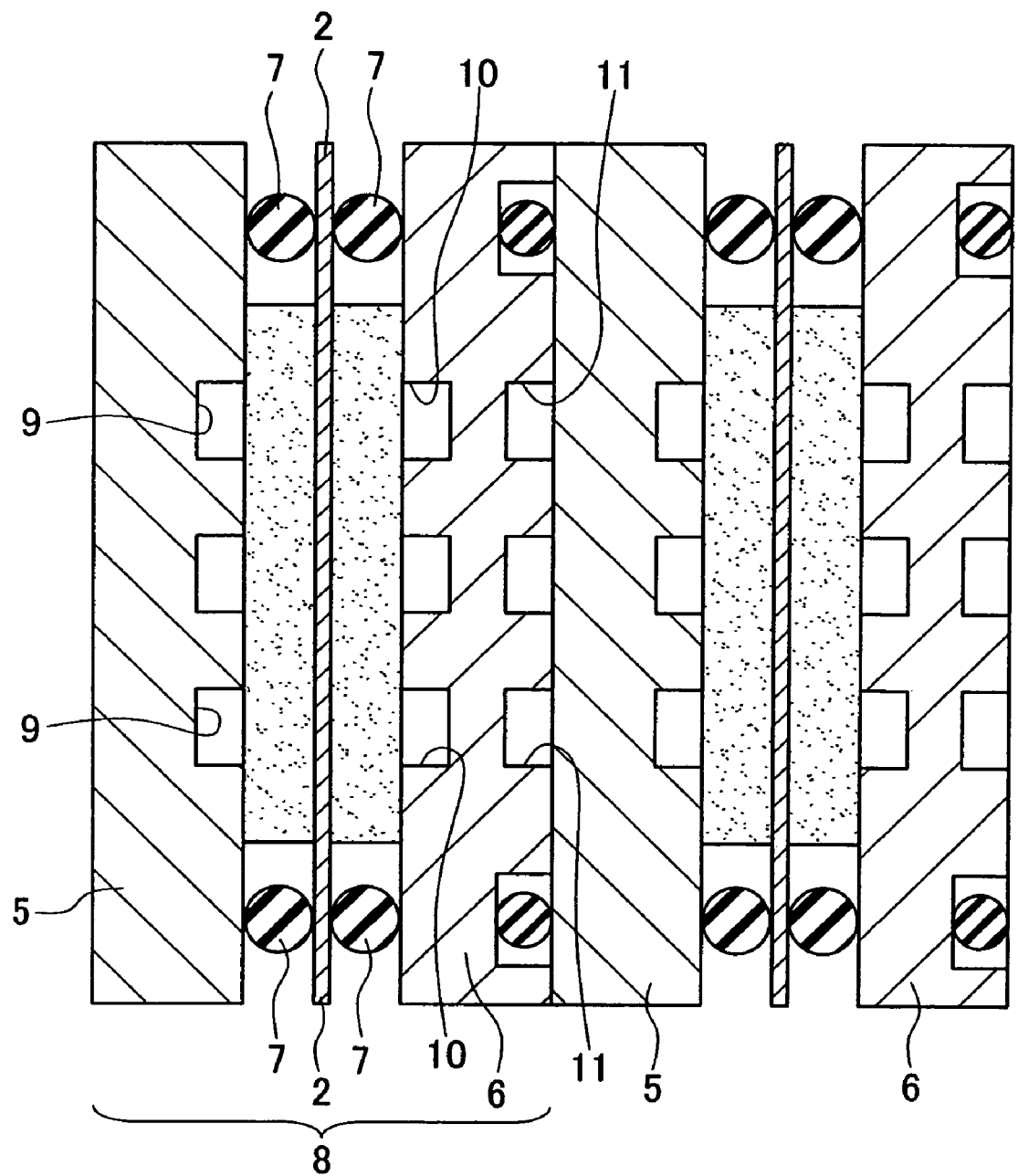
FIG. 11 is a cross section showing a conventional fuel cell unit.
Figure 12:
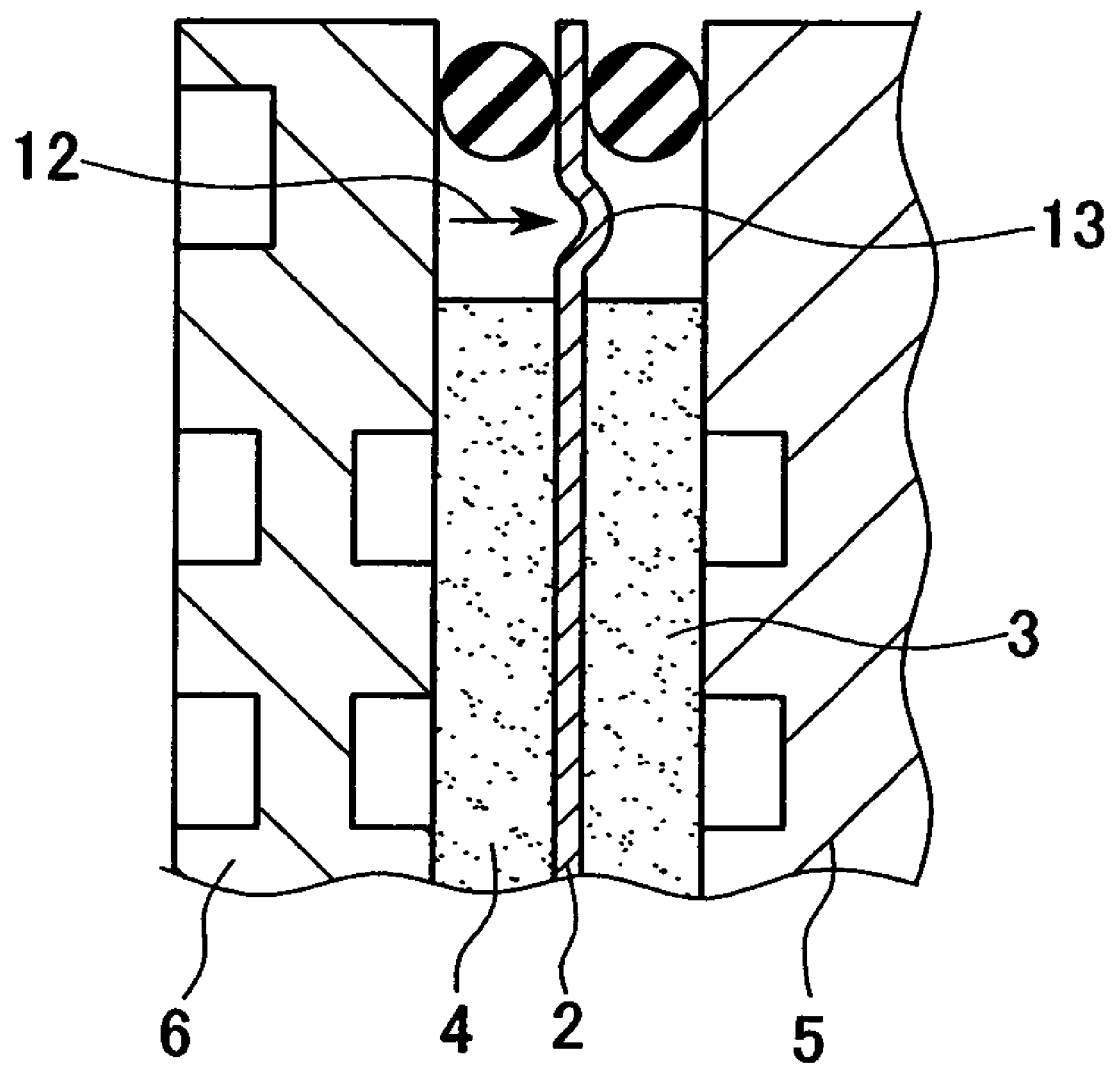
FIG. 12 is a view explaining problems caused in the conventional art.
Figure 13:
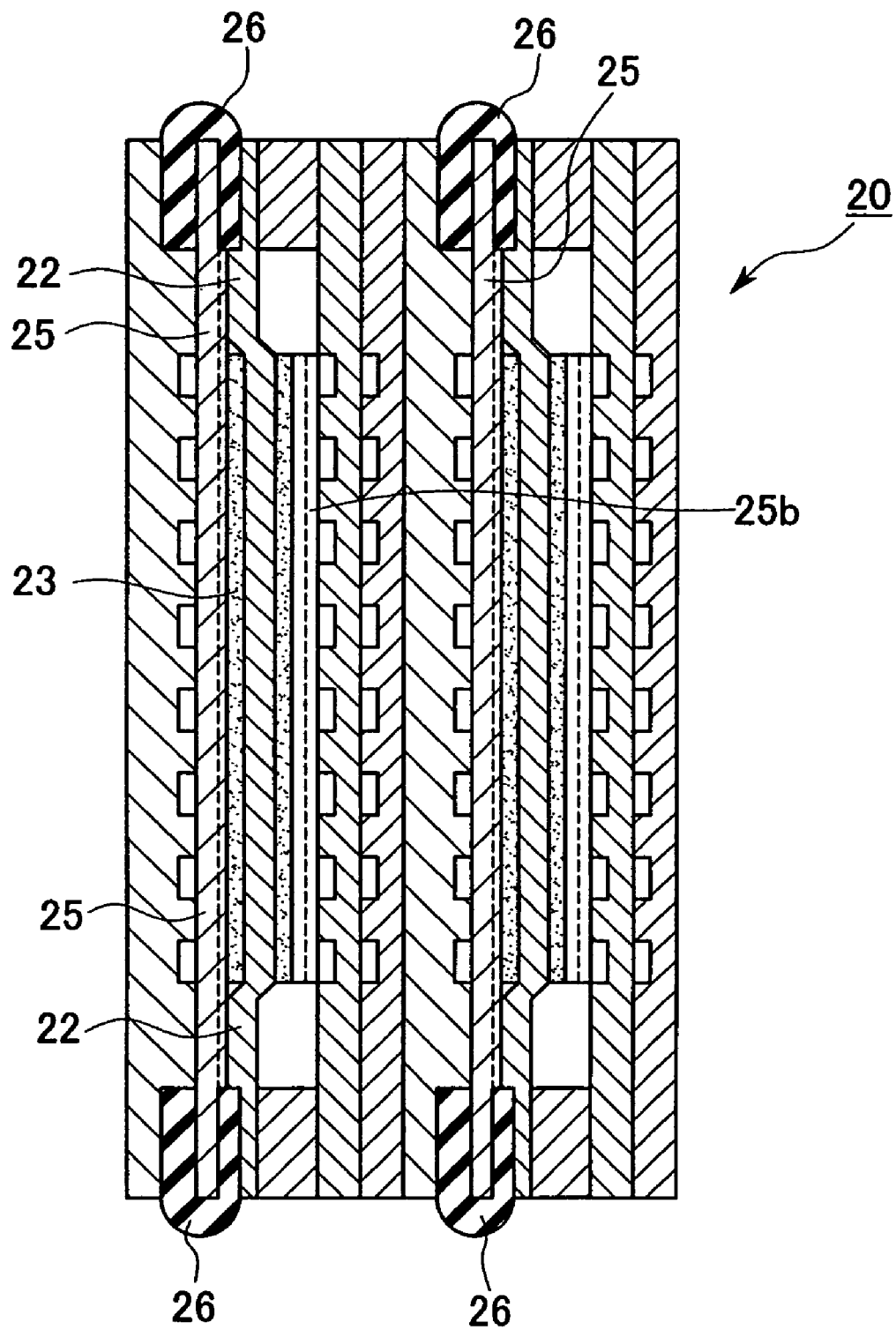
FIG. 13 is a cross section showing a conventional fuel cell unit.

FIG. 9 is a cross section showing a membrane electrode assembly 120 having an electrolyte membrane of a fifth embodiment of the present invention. In the membrane electrode assembly 120 having an electrolyte membrane, a frame-shaped seal member 122 overlaps an inner surface peripheral edge section of the cathode side gas diffusion layer 36, and the thickness of the frame-shaped member 123 which is formed by the frame-shaped seal member 122 and the cathode side gas diffusion layer 36 is formed so as to be the same over the entire surface thereof. In this way, in addition to the effect of overlapping in the third embodiment as above explained, it is possible to increase the strength in the thickness direction as well as a case of the fourth embodiment.

In embodiments explained above, although an explanation is made of the case in which the frame-shaped seal member is formed on the cathode side gas diffusion layer 36, it is acceptable if the frame-shaped seal member is disposed on the anode side gas diffusion layer.

What is claimed is:

1. A fuel cell unit comprising a membrane electrode assembly, and a pair of separators which sandwiches the membrane electrode assembly, wherein the membrane electrode assembly comprises:

a solid polymer electrolyte membrane;

first and second gas diffusion electrodes which are disposed respectively on opposite sides of the solid polymer electrolyte membrane, the first gas diffusion electrode having a peripheral edge region; and a frame-shaped first seal member having a rectangular cross section which is disposed so as to cover said peripheral edge region only of the first gas diffusion electrode and covers and supports a peripheral part of the solid polymer electrolyte membrane that extends over the first gas diffusion electrode and the first seal member; and a second seal member having a circular cross section which is disposed on the peripheral part of the solid polymer electrolyte membrane, wherein the second seal member has a shape different from a shape of the frame-shaped first seal member, a dimension of the pair of the separators is larger than a dimension of the membrane electrode assembly; and a third seal member is sandwiched between the separators, wherein the first and second gas diffusion electrodes are substantially the same size and coextensive relative to each other.

* * * * *